(12) United States Patent
Pierse et al.

(10) Patent No.: US 9,789,578 B2
(45) Date of Patent: Oct. 17, 2017

(54) COUNTERFORCE MECHANISM AND METHODS OF OPERATION THEREOF

(75) Inventors: Michael Pierse, Bedfordshire (GB); Trevor Stolber, Bedfordshire (GB)

(73) Assignee: Fives Landis Limited, Keighley (GB)

( * ) Notice: Subject to any disclaimer, the term of this patent is extended or adjusted under 35 U.S.C. 154(b) by 1343 days.

(21) Appl. No.: 13/580,760

(22) PCT Filed: Mar. 2, 2011

(86) PCT No.: PCT/GB2011/050414
§ 371 (c)(1),
(2), (4) Date: Oct. 8, 2012

(87) PCT Pub. No.: WO2011/107798
PCT Pub. Date: Sep. 9, 2011

(65) Prior Publication Data
US 2013/0025896 A1    Jan. 31, 2013

(30) Foreign Application Priority Data

Mar. 2, 2010 (GB) .................................. 1003452.8
Aug. 4, 2010 (GB) .................................. 1013102.7

(51) Int. Cl.
*B23Q 11/00* (2006.01)
*B23Q 5/28* (2006.01)

(52) U.S. Cl.
CPC ............ *B23Q 11/0025* (2013.01); *B23Q 5/28* (2013.01); *B23Q 11/0028* (2013.01)

(58) Field of Classification Search
CPC .............. B23Q 11/001; B23Q 11/0028; B23Q 11/0025; B23Q 11/0017
(Continued)

(56) References Cited

U.S. PATENT DOCUMENTS 2,696,763 A * 12/1954 Daugherty ......... B23Q 11/0017
                                                          408/235
2,972,264 A *  2/1961 Brown ..................... F16F 15/28
                                                          451/165
(Continued)

FOREIGN PATENT DOCUMENTS

CN    201025294 Y    2/2008
CN    201061830 Y    5/2008
(Continued)

OTHER PUBLICATIONS

Translation DE10339260, Jan. 27, 2016, 4 pages.*
(Continued)

*Primary Examiner* — Robert Long
*Assistant Examiner* — Eyamindae Jallow
(74) *Attorney, Agent, or Firm* — Wood Herron & Evans LLP

(57) ABSTRACT

A counterforce mechanism is arranged to exert a force on an object to maintain the object at a desired position. The mechanism comprises a driven body, a drive for moving the driven body, and a resilient coupling arrangement for coupling the driven body to a portion of an object. A control arrangement is arranged to output a drive signal to the driven body drive to move the driven body to a location where it exerts a force on the object via the coupling arrangement, such that the force counteracts an opposing force acting on the object and the mechanism holds the portion of the object at the desired position. A machine axis and a machine tool incorporating such a counterforce mechanism are also described, together with methods of operation thereof.

25 Claims, 14 Drawing Sheets

(58) Field of Classification Search
USPC .................. 173/152, 156, 165, 213, 217
See application file for complete search history.

(56) References Cited

U.S. PATENT DOCUMENTS

| | | | | |
|---|---|---|---|---|
| 3,168,000 | A * | 2/1965 | Deflandre | B23Q 11/0017 408/235 |
| 3,671,133 | A * | 6/1972 | Galbarini | B23Q 11/001 408/235 |
| 3,683,744 | A * | 8/1972 | Briesofsky | B23C 1/00 408/235 |
| 3,684,395 | A * | 8/1972 | Nurakami | B23Q 11/0017 408/235 |
| 4,149,822 | A * | 4/1979 | Lehmkuhl | B23Q 11/001 408/235 |
| 4,807,518 | A * | 2/1989 | Berchtold | B23Q 11/0028 91/361 |
| 4,835,871 | A * | 6/1989 | Pesikov | G01B 5/0016 188/322.22 |
| 4,896,869 | A * | 1/1990 | Takekoshi | B23P 19/04 269/309 |
| 4,949,465 | A * | 8/1990 | Pesikov | G01B 5/0016 33/1 M |
| 5,241,183 | A * | 8/1993 | Kanai | H01L 21/68 248/178.1 |
| 5,303,549 | A * | 4/1994 | Berchtold | B23Q 11/001 60/414 |
| 5,425,237 | A * | 6/1995 | Suer | G05B 19/404 318/611 |
| 5,518,550 | A * | 5/1996 | Korenaga | G03F 7/709 118/500 |
| 6,041,597 | A * | 3/2000 | Huang | B23Q 11/001 60/415 |
| 6,204,473 | B1 * | 3/2001 | Legge | B23K 26/037 219/121.67 |
| 6,239,573 | B1 | 5/2001 | Schmall | |
| 6,334,745 | B1 * | 1/2002 | Bennett, Sr. | B23Q 39/024 408/1 R |
| 6,359,677 | B2 * | 3/2002 | Itoh | G03F 7/70758 318/625 |
| 6,408,045 | B1 | 6/2002 | Matsui et al. | |
| 6,442,858 | B1 | 9/2002 | Asano | |
| 6,821,064 | B2 * | 11/2004 | Hirabayashi | G05B 19/404 409/237 |
| 7,004,060 | B2 * | 2/2006 | Huang | F15B 1/02 60/410 |
| 7,665,200 | B1 * | 2/2010 | Shimooka | B23Q 1/626 29/560 |
| 8,408,045 | B2 * | 4/2013 | Forrer | G01N 9/002 73/32 A |
| 2001/0037888 | A1 * | 11/2001 | Akamatsu | B23Q 3/1554 173/2 |
| 2006/0242959 | A1 * | 11/2006 | Tanizaki | B23Q 1/38 60/477 |

FOREIGN PATENT DOCUMENTS

| | | | |
|---|---|---|---|
| CN | 101391658 A | 3/2009 | |
| CN | 201401478 Y | 2/2010 | |
| DE | 103 39 260 A1 | 3/2005 | |
| DE | 10339260 A1 * | 3/2005 | ............ B23Q 5/28 |
| EP | 0 917 004 A2 | 5/1999 | |
| EP | 1 122 016 A1 | 8/2001 | |
| EP | 1 320 178 A1 | 6/2003 | |
| JP | 5-283321 A | 10/1993 | |

OTHER PUBLICATIONS

Patent Abstracts of Japan, Computer Generated English Abstract of Japanese Publication No. 05-283321, Published Oct. 29, 1993 (2 pages).
UK Intellectual Property Office, Patents Act 1977: Search Report Under Section 17, Application No. GB1003452.8, dated Jun. 30, 2010 (1 page).
UK Intellectual Property Office, Patents Act 1977: Search Report Under Section 17, Application No. GB1013102.7, dated Dec. 2, 2010 (1 page).
ESPACENET, English Machine Translation of Abstract for CN201025294Y, published Feb. 20, 2008, retrieved from http://worldwide.espacenet.com dated Mar. 4, 2015 (1 page).
ESPACENET, English Machine Translation of Abstract for CN201061830Y, published May 21, 2008, retrieved from http://worldwide.espacenet.com dated Mar. 4, 2015 (1 page).
ESPACENET, English Machine Translation of Abstract for CN101391658A, published Mar. 25, 2009, retrieved from http://worldwide.espacenet.com dated Mar. 4, 2015 (1 page).
ESPACENET, English Machine Translation of Abstract for CN201401478Y, published Feb. 10, 2010, retrieved from http://worldwide.espacenet.com dated Jan. 30, 2015 (1 page).
ESPACENET, English Machine Translation of CN201025294Y, published Feb. 20, 2008, retrieved from http://worldwide.espacenet.com dated Mar. 4, 2015 (3 pages).
ESPACENET, English Machine Translation of CN201061830Y, published May 21, 2008, retrieved from http://worldwide.espacenet.com dated Mar. 4, 2015 (5 pages).
ESPACENET, English Machine Translation of CN101391658A, published Mar. 25, 2009, retrieved from http://worldwide.espacenet.com dated Mar. 4, 2015 (2 pages).
ESPACENET, English Machine Translation of CN201401478Y, published Feb. 10, 2010, retrieved from http://worldwide.espacenet.com dated Jan. 30, 2015 (8 pages).
European Patent Office, European Search Report, Application No. EP 14 18 5034, dated Feb. 12, 2015 (2 pages).
Espacenet.com, English Machine Translation of DE10339260A1, published Mar. 24, 2005, retrieved from http://worldwide.espacenet.com dated Aug. 14, 2012 (8 pages).
European Patent Office, International Search Report and Written Opinion of the International Searching Authority, International Application No. PCT/GB2011/050414, dated Dec. 28, 2011 (12 pages).

* cited by examiner

COUNTERFORCE MECHANISM AND METHODS OF OPERATION THEREOF

CROSS-REFERENCE TO RELATED APPLICATION

This application is a submission under 35 U.S.C. §371 of International Application No. PCT/GB2011/050414, filed Mar. 2, 2011, which claims priority to Great Britain Application No. 1003452.8, filed Mar. 2, 2012, and which claims priority to Great Britain Application No. 1013102.7, filed Aug. 4, 2010, the disclosures of which are hereby expressly incorporated by reference herein in their entireties.

Field of the Invention

The present invention relates to a counterforce mechanism for exerting a force on an object to maintain the object at a desired position. In one implementation, it concerns a machine axis including means to counteract forces acting on a moving component of the machine axis. According to another aspect, it is applicable to supports for a machine tool.

Background of the Invention

A machine tool may include a machine axis arranged so as to enable translation of a tool and a workpiece relative to each other. This translation may take place in a vertical direction, in an inclined direction having a horizontal component as well as a vertical component, a horizontal direction, or with relative movement in a rotational direction. Either the tool or the workpiece may be carried by the axis. On occasions, a machine axis may experience a constant load applied to it. For example a drive for motivating a linear axis having a vertical component to its direction of travel will, in addition to overcoming friction, process forces and the like, be required to overcome gravitational forces acting on it. Similarly, a rotary axis could be subject to a constant load from, for example, a constant, continuous process friction.

The term "machine axis" is used to denote a device assembly in which one part is driven relative to another, as opposed to a notional reference axis such as an axis of motion.

Feed drives on linear axes on machine tools have traditionally incorporated a high-response servo motor coupled to a screw actuator to drive both vertical and horizontal axes. Generally, the screw threads have low helix angles which give the drive a high mechanical advantage. This reduces the effort required by the motor to overcome friction and gravitational effects. In addition, many screw drives, particularly those of plain bearing designs (as opposed to ball screws) have sufficient internal friction to make them "non-reversible". That is, applying a force to the linear axis does not cause the screw to rotate. This can be advantageous in that when the power to the drive motor is removed, the linear axis holds its position. Where screws are reversible, a screw or motor mounted brake is generally applied. With a high mechanical advantage in the mechanism, only a low clamping force is needed to hold the axis stationary.

In the case of rotary axes on machine tools, drives have traditionally incorporated similar high response servo motors coupled to some form of torque multiplying device, such as a worm and wheel, gear set or belt drive, to give the high mechanical advantage required. Many of these systems are also "non-reversible" but where they are not, a brake that is coupled to the drive side of the torque multiplying device would, again, need low torque to clamp the axis.

More recently, the use of direct motor drives has enhanced the accuracy of linear and rotary machine drives. They avoid some of the resonant mechanical interfaces otherwise encountered in the drive train. They may also provide an improved dynamic positioning capability through the ability of their wider bandwidth servo system to overcome non-linear effects, such as "stick-slip motion" or hysteresis.

However, a direct motor drive does not enjoy the non-reversible characteristics exhibited by a screw drive and has zero mechanical advantage. A direct motor drive must be constantly energised to overcome forces acting on a machine axis. The resulting resistance losses in the direct motor drive cause heating and energy consumption which is not recovered at any time in the duty cycle. Additional measures are required if a machine axis is to be held in position against such forces when the drive power is removed.

There are a number of known measures used to counteract the gravity loading on a vertical axis. One example is provision of a counterbalance carriage to apply a counter-running force to a vertical axis. This may include a second vertical axis, with a carriage of similar mass to the main axis carriage, linked to the main carriage by means of cables or chains running over a pulley system at the top of the machine.

Such an arrangement is able to perform satisfactorily when only low velocities and accelerations are required, but significant problems are encountered in more dynamic applications.

U.S. Pat. No. 5,518,550 discloses a stage apparatus for use in the manufacture of semiconductor devices. It includes a constant tension spring for cancelling out gravitational forces exerted on a vertically moveable stage. However, such springs are prone to metal fatigue and dynamic problems may arise due to the excitation of undamped resonant frequencies in the spring mechanism.

Counterbalancing forces are also provided in some machine tools by pneumatic or hydraulic cylinders. However, accurate control may be hampered by stick-slip friction from cylinder seals, and flow capacity and hysteresis problems caused by the flow control valves that maintain the constant pressure within the cylinders. Also, the significant air flow demands when operating at higher carriage velocities can be problematic.

Another aspect of machine tools to which the present invention relates is the provision of resilient support for the machine tool itself. Machine tools are often supported on vibration isolation feet, either to prevent ground-borne vibration from disturbing the machine's process capability, or conversely to prevent machine-generated vibration from causing the floor to vibrate. Known mechanisms which are used to achieve this isolation range from a simple block of compliant material to complex spring-damper systems. Whilst these systems often provide good isolation, they tend to have little or no support stiffness which may be problematic if a moving component shifts the centre of gravity of a machine causing it to tilt.

In another known form of isolation system, supports are provided in the form of pneumatically pressurised chambers. Any height variation is sensed and the pressure in the chambers is adjusted to maintain the machine position when a mass movement occurs. However, the performance of such systems has been found to be inadequate, leading to residual tilts and height variations.

SUMMARY OF THE INVENTION

The present invention provides a counterforce mechanism for exerting a force on an object to maintain the object at a desired position, comprising:

a driven body;

a drive for moving the driven body;

a resilient coupling arrangement for coupling the driven body to a portion of an object; and a control arrangement arranged to output a drive signal to the driven body drive to move the driven body to a location where it exerts a force on the object via the coupling arrangement, such that the force counteracts an opposing force acting on the object and the mechanism holds the portion of the object at the desired position.

With this mechanism, a variable correcting force can be applied via a resilient coupling arrangement to control the position of an object whilst avoiding any rigid coupling between the driven body (which may also be referred to as an impeller) and the object. The presence of a resilient coupling for exerting the counterforce may be advantageous in some applications by providing a degree of tolerance in the positioning accuracy of the driven body. It may also be beneficial in reducing the transfer of vibrations between the object and its surroundings.

In a preferred embodiment, the mechanism is configurable to exert a force on a portion of the object such that the portion is held at a predetermined height above a support surface. For example, the resilient coupling arrangement may bear against part of the base or bed of a machine tool.

A sensor may be provided for detecting displacement of the portion of the object from its desired position and outputting a signal to the control arrangement in response thereto, so that the counterforce mechanism can respond by adjusting the applied counterforce as appropriate to return the object to its desired position.

The present invention further provides a machine axis for a machine tool, comprising:

a support for supporting a tool or a workpiece;

a support drive for moving the support; and a counterforce mechanism as defined herein, wherein the coupling arrangement couples the support and the driven body to each other, such that the driven body is moveable by the driven body drive to a position dependent on the position of the support so as to exert a force on the support via the coupling arrangement to counteract a force acting on the support and thereby hold the support at the desired position.

In this configuration, the position of the support is dictated by the associated drive. The driven body is positioned so as to exert a force on the support via the coupling arrangement to counteract forces acting on the support. Thus, the support is held at the desired location, even when power is removed from its drive.

The characteristics of the resilient coupling arrangement may be selected such that the force exerted on the support by the driven body does not vary to an unacceptable extent over the positioning tolerance associated with the second drive. This facilitates application of a counteractive force to the support in an accurate manner, without adding to the inertia of the support, in contrast to known counterbalance arrangements discussed above. Furthermore, the force is applied in a reliable and robust manner without significantly affecting the position for the support determined by the first drive.

The axis of motion of the support may be linear or rotary.

Preferably, the first drive is a linear or rotary motor drive. This affords a high level of accuracy in the positioning of the support. The resilience of the coupling arrangement means that where a lower accuracy drive is employed for the driven body, inaccuracy in the positioning of the driven body may not influence the position of the support to a material extent.

The resilient coupling arrangement may comprise a coil spring, some form of flexure, or a gas spring, or any other means of providing a force from a physical compression or tension.

A damping mechanism may be provided for controlling or reducing the relative velocity of the support and the driven body.

In preferred embodiments, the machine axis includes a safety mechanism for resisting a decrease in the spacing between the support and the driven body beyond a minimum threshold and/or an increase in the spacing beyond a maximum threshold. For example, one of the support and the driven body may engage an abutment supported by the other when a threshold is reached. Such a mechanism can provide a failsafe device in case of failure of the coupling arrangement for example.

A brake mechanism may be provided to resist movement of the support when the driving force exerted by the first drive is removed. In view of the presence of the counterbalancing mechanism described herein in association with the support, a less powerful brake mechanism than would otherwise be required may be sufficient as it may not need to resist the full gravitational forces acting on the support.

Preferably, the driven body is moveable along the same direction as the support. For example both may extend in a vertical direction. In one particular arrangement, the support and driven body are moveable along a common guideway. Alternatively, the driven body may have one or more dedicated guideways.

According to a further embodiment, the driven body may be locatable within the support. Thus, the driven body may be substantially or wholly accommodated within the dimensions of the support to provide a more compact configuration.

The coupling arrangement may for example consist solely of a resilient component which exerts a force directly on the support. In another configuration, the coupling arrangement includes a connector coupled in series with a resilient component. In one implementation, the connector extends over a pulley. It may be in the form of a cable or chain, for example.

The second drive associated with the driven body may be in the form of a screw drive, a rack and pinion drive, a friction drive, a capstan drive, a pneumatic drive, or a hydraulic drive. A drive having lower positioning accuracy than the first drive may be suitable, as the support is substantially isolated from any positioning inaccuracy of the driven body by the resilience of the coupling arrangement.

According to another aspect, the present invention provides a method of operating a counterforce mechanism as described herein, comprising the step of:

outputting a drive signal from the control arrangement to the driven body drive to cause the drive to move the driven body to a location where it exerts a force on the object via the coupling arrangement, such that the force counteracts an opposing force acting on the object and the mechanism holds the portion of the object at the desired position.

The method may further include a step of generating an input signal in response to displacement of the object from the desired position and transmitting the input signal to the control arrangement.

Alternatively or additionally, the method may include a step of generating an input signal representing a desired position for the object and transmitting the input signal to the control arrangement. This desired position represented in the input signal may for example be a position defined by a user or by a control program being executed by a machine tool for example.

The present invention further provides a method of operating a machine axis as described above, comprising the steps of:
moving the support with the support drive to a first predetermined location;
moving the driven body with the driven body drive to a second predetermined location dependent on the first predetermined location so as to exert a force on the support via the coupling arrangement to counteract forces acting on the support.

These steps may be carried out consecutively, or may overlap to some extent. Preferably, they are substantially simultaneous.

The primary drive may well be unable to reliably hold the support (and any tools or workpieces mounted on it) in position alone. Thus, the driven body may be arranged and/or controlled so as to exert a counterbalancing force on the support at all times via the coupling arrangement. Preferably the magnitude of the counterbalancing force is kept substantially constant. The coupling arrangement may be coupled between the driven body and the support throughout the execution of a procedure by the machine axis.

The force exerted on the support drive via the coupling arrangement may equate to part or substantially all of the forces acting on the support. This may depend on the frictional forces present in the support drive, for example.

The present invention also lies in a machine axis for a machine tool, comprising:
a main guided body (for example a primary carriage), for supporting and directing a tool or workpiece;
a first drive for moving the main guided body;
a secondary guided body (for example a driven body or impeller or secondary carriage);
a second drive for moving the secondary guided body;
a resilient coupling arrangement for coupling the main guided body to the second guided body to each other, such that the second guided body is moveable to a location dependent on the location of the main guided body such as to exert a force on the main guided body via the coupling arrangement to counteract forces on the main guided body.

In a linear application, the primary and secondary guided bodies would for example be carriages guided by bearing rails, and for rotary applications, the guided bodies would comprise shafts or spindles, supported by rotary bearings of some type.

In a rotary application, the support may be moveable in use about an axis, and the driven body moveable about an axis to an angular position dependent on the angular position of the support so as to exert a force on the support via the coupling arrangement to counteract torsional forces acting on the support. The support and the driven body may rotate around a common axis of rotation. The second drive may be selected from: a worm and wheel, gear set or belt drive.

In the description below, the vertical linear example is first described, where gravitational forces are to be counteracted. However the invention is applicable to linear or rotary axis configurations where a linear force (or rotary torque) to be resisted comes from any source.

BRIEF DESCRIPTION OF THE DRAWINGS

Embodiments of the present invention will now be described by way of example and with reference to the accompanying schematic drawings, wherein.

DETAILED DESCRIPTION OF THE INVENTION

Figure 1:
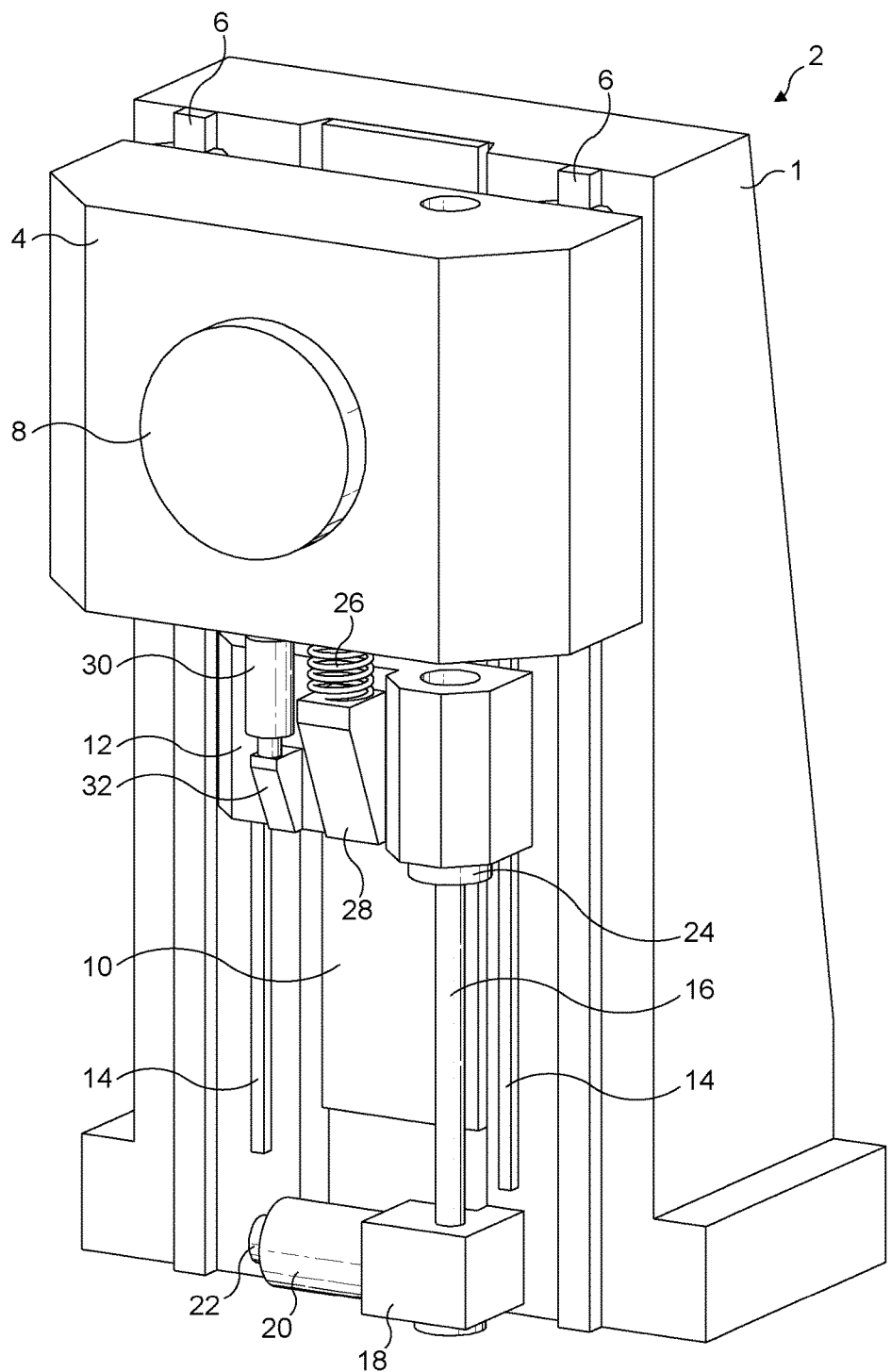
FIG. 1 is a front perspective view of a vertical axis for a machine tool which embodies the present invention.

The same reference signs are generally used in the drawings to refer to corresponding or similar features in modified and different embodiments.

In the vertical axis 2 shown in FIGS. 1 to 4, a support in the form of a primary carriage 4 is moveable along a pair of guideways or guide rails 6 carried by a support column 1. A mount 8 is provided on the front face of the carriage for attaching a tool or workpiece. The primary carriage is driven along the guideways by a linear motor 10.

A driven body or secondary carriage 12 is provided for movement along a direction parallel to the guideways of the primary axis. It moves along respective linear guideways 14 provided on a front vertical face of the support column 1. The secondary carriage is driven by a screw drive.

The screw drive for the secondary carriage comprises a vertical screw 16 which is supported by a support block 18 and driven by a servo motor 20. A direct coupled angular encoder 22 is fitted to the servo motor 20 to provide feedback to a machine controller regarding the position of the secondary carriage. In the illustrated embodiment, the servo drive is orientated perpendicularly with respect to the screw axis, but it will be appreciated that other configurations may be adopted.

Screw 16 engages a screw nut 24 mounted on the secondary carriage 12. Thus, rotation of the screw by servo motor 20 displaces the secondary carriage in the vertical direction.

Figure 3:
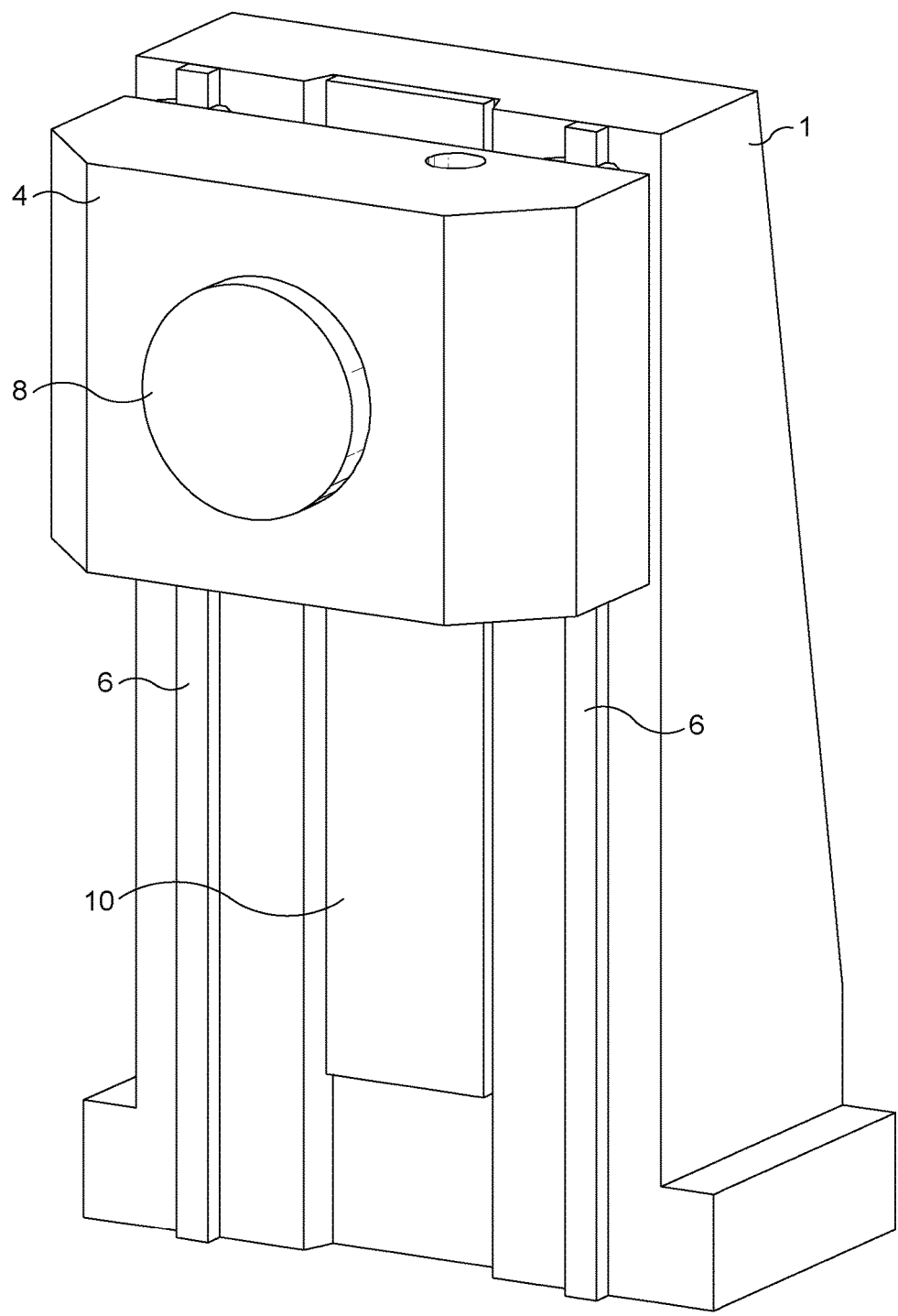
FIGS. 3 and 4 are front perspective views of the machine axis of FIG. 1 with the support and the driven body alone mounted on the axis, respectively.
Figure 4:
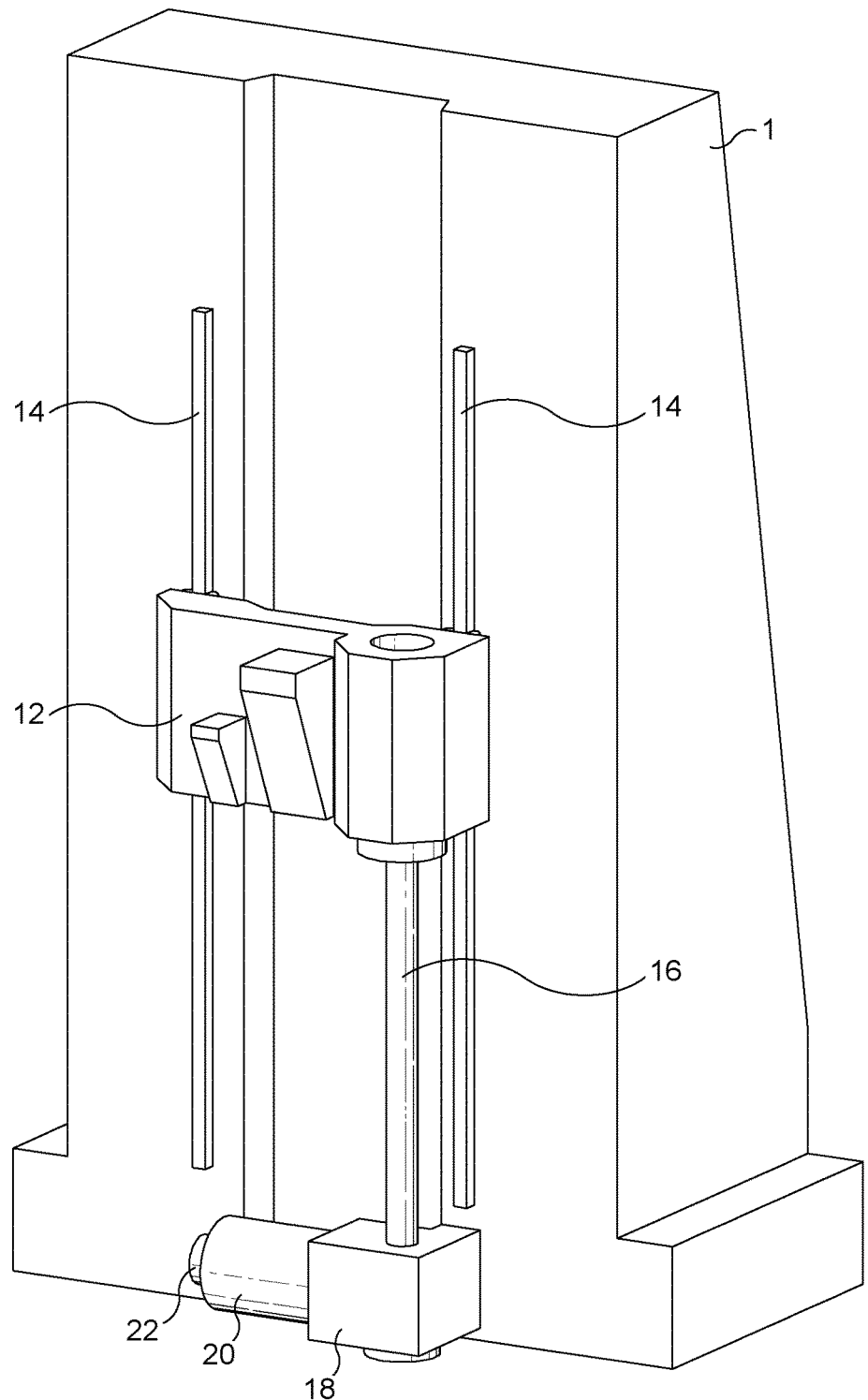

For the purposes of illustration, support column 1 is shown in FIGS. 3 and 4 with only one of the primary and secondary carriages and its associated drives and guideways, respectively.

Figure 2:
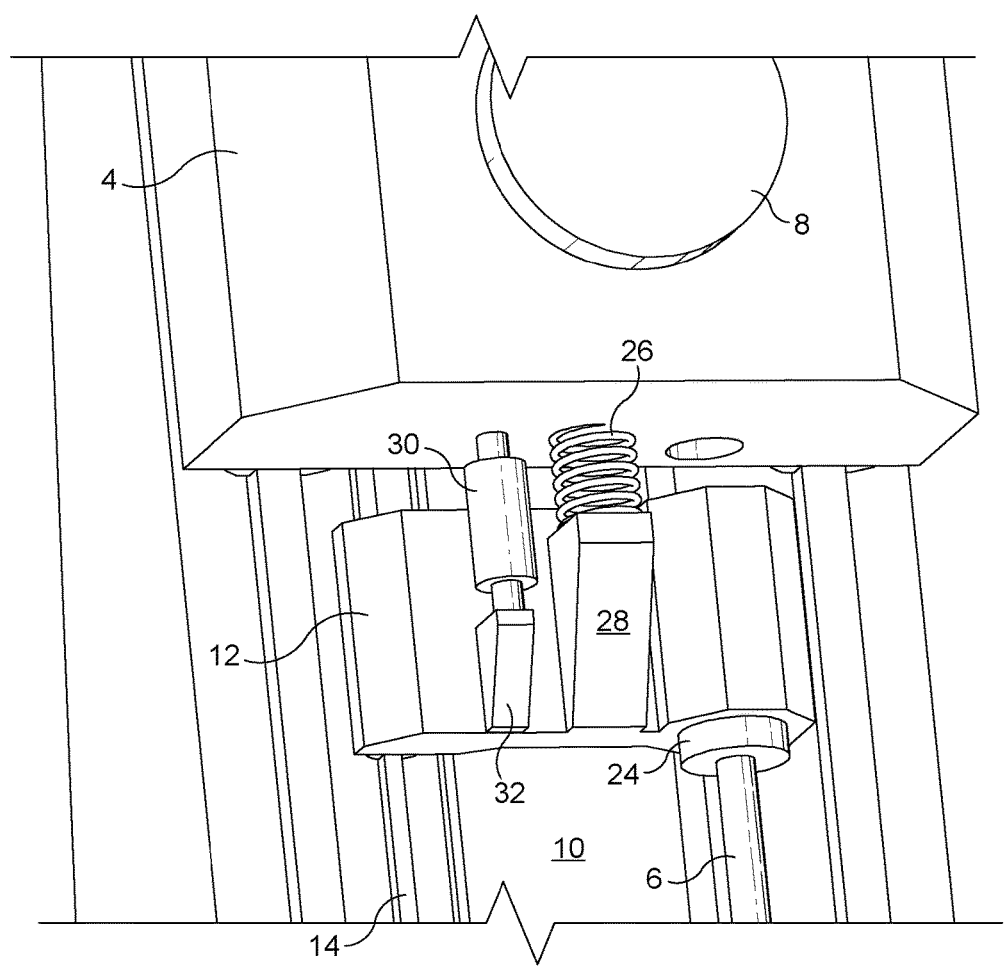
FIG. 2 is an enlarged perspective view of the driven body forming part of the vertical axis shown in FIG. 1.

As shown in FIGS. 1 and 2, a resilient component in the form of a coil spring 26 is located with its axially opposed ends in engagement with the primary and secondary carriages, respectively. This provides a resilient coupling arrangement between the two carriages, and the secondary carriage is able to exert an upwards force on the primary carriage via this coupling arrangement to counteract gravitational forces acting on the primary carriage. The force from the resilient component is preferably applied to the primary carriage through the centre of gravity of the primary carriage mass. The lower end of the coil spring is supported by and attached to a mount 28 on the secondary carriage.

A damping mechanism 30 is provided between the primary and secondary carriages for reducing the impulse exerted on each carriage as they approach each other. It is supported at its lower end by a mount 32 on the secondary carriage.

In operation of the vertical axis shown in FIGS. 1 to 4, the primary carriage 4 is driven to a desired position with relatively high accuracy by the linear motor 10, under the control of a controller included in the machine tool of which the axis forms a part (such as a CNC control system). The secondary carriage 12 is simultaneously driven to a position below and adjacent to the primary carriage by a relatively low cost ball screw drive under the control of the controller with a relatively low, but adequate positioning accuracy. Coil spring 26 maintains engagement with the underside of the primary carriage 4, thereby applying a vertical axial force to the primary vertical axis carriage.

The spacing between the primary and secondary carriages needed to exert a counterbalancing force equal and opposite to the gravitational forces acting on the primary carriage (and any components mounted on it) may be determined by turning off the drive for the primary carriage and allowing its weight to be borne solely by the secondary carriage. This will indicate the desired spacing, which can then be recorded in the machine controller for reference during a subsequent machining procedure. This procedure could be used to reset the magnitude of the correct spacing when the total mass of the primary drive and anything carried by it changes.

The resilient coupling provided by the coil spring is arranged to have a relatively low spring rate (or equivalent characteristic in other forms of resilient component), such that variations in the force it applies on the primary carriage resulting from any errors in positioning of the secondary carriage are acceptably low.

For example, the potential counterbalance force errors may be estimated by assuming that the secondary carriage position would be no further than 0.1 mm away from its demand, so the force applied to the primary carriage by the spring should be substantially constant over this variation. By way of illustration, a die spring of 50 mm outside diameter with a free length of 150 mm would compress by approximately 20 mm when supporting a 500 kg carriage. Therefore, a + or −0.1 mm potential positioning error for the secondary carriage gives a counterbalance force variation of as little as 25N (+ or −0.5%). For higher mass primary carriages, multiple springs (or other couplings) could be used to provide the required force.

The machine axis receives control signals from a controller of the machine tool. In order to effect a movement of a tool or workpiece mounted on the axis, the controller sends signals to the drives for the primary and secondary carriages instructing each of them to carry out the same movement. Thus, the secondary carriage effectively mimics the movements made by the primary carriage so as to continously provide a counterbalancing force.

If appropriate, a greater degree of control over the magnitude of the counterbalancing force could be obtained by providing a measurement device to monitor the spacing between the primary and secondary carriages. The machine controller could be arranged to adjust the position of the secondary carriage if necessary having regard to an output signal from the measurement device, in order to maintain a constant spacing and therefore a constant counterbalancing force. Alternatively, the position of the secondary carriage could be adjusted so as to minimise the current demand of the primary drive as measured by the machine controller.

It will be appreciated that several modifications or variations to the configuration shown by way of example in FIGS. 1 to 4 are encompassed by the present invention.

Figure 5:
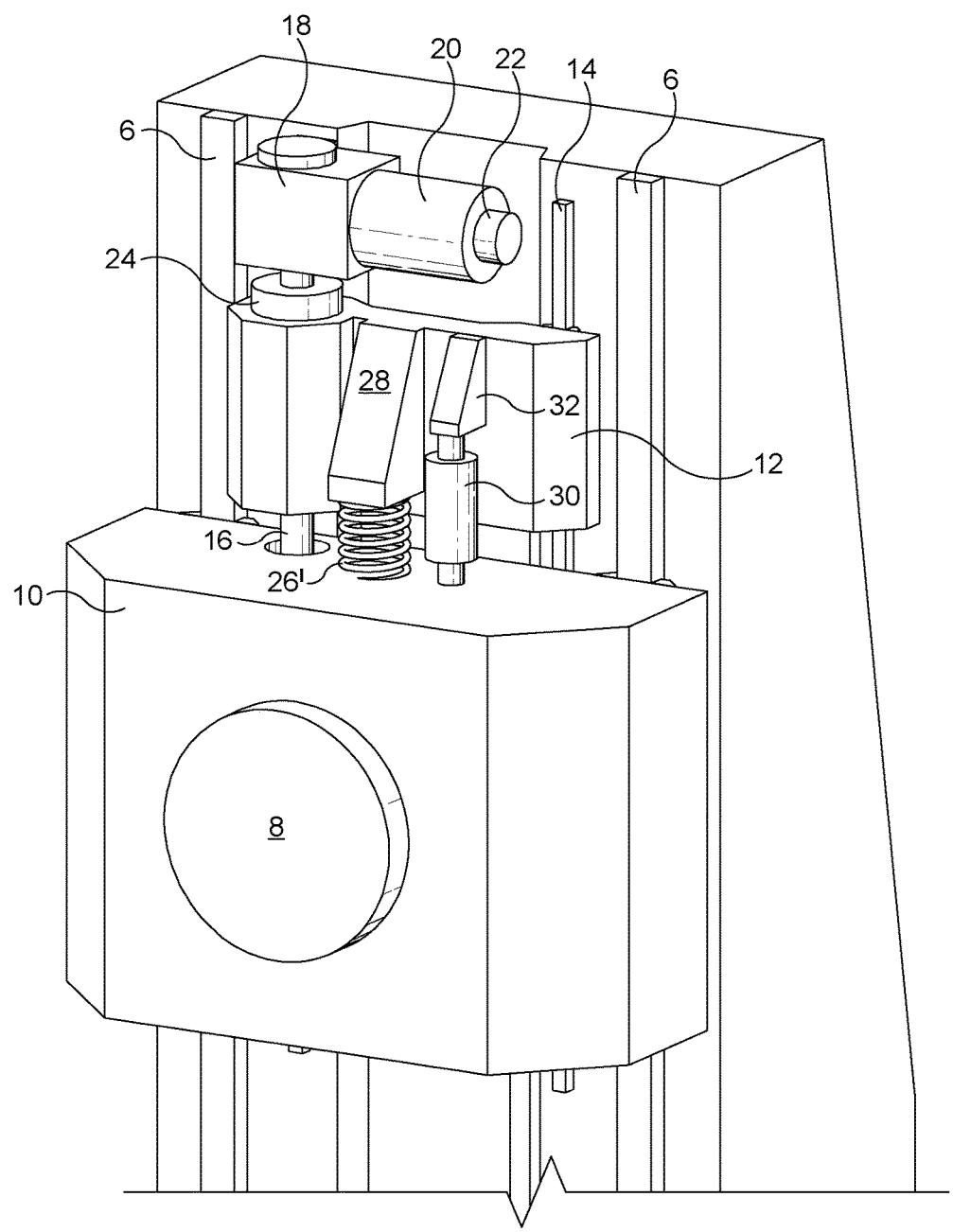
FIG. 5 is an enlarged perspective view of the upper portion of a machine axis according to a further embodiment of the invention.

In the arrangement illustrated in FIGS. 1 to 4, the secondary carriage is positioned below the primary carriage, with the load support being provided by a compression spring 26. Alternatively, the secondary carriage could be positioned above the primary carriage, with the load support being provided by a tension spring (or other resilient component in tension). Such an arrangement is depicted in FIG. 5, in which the primary carriage is attached to the lower end of tension spring 26'. The secondary carriage is hung from, rather than supported by, the screw drive.

Figure 6:
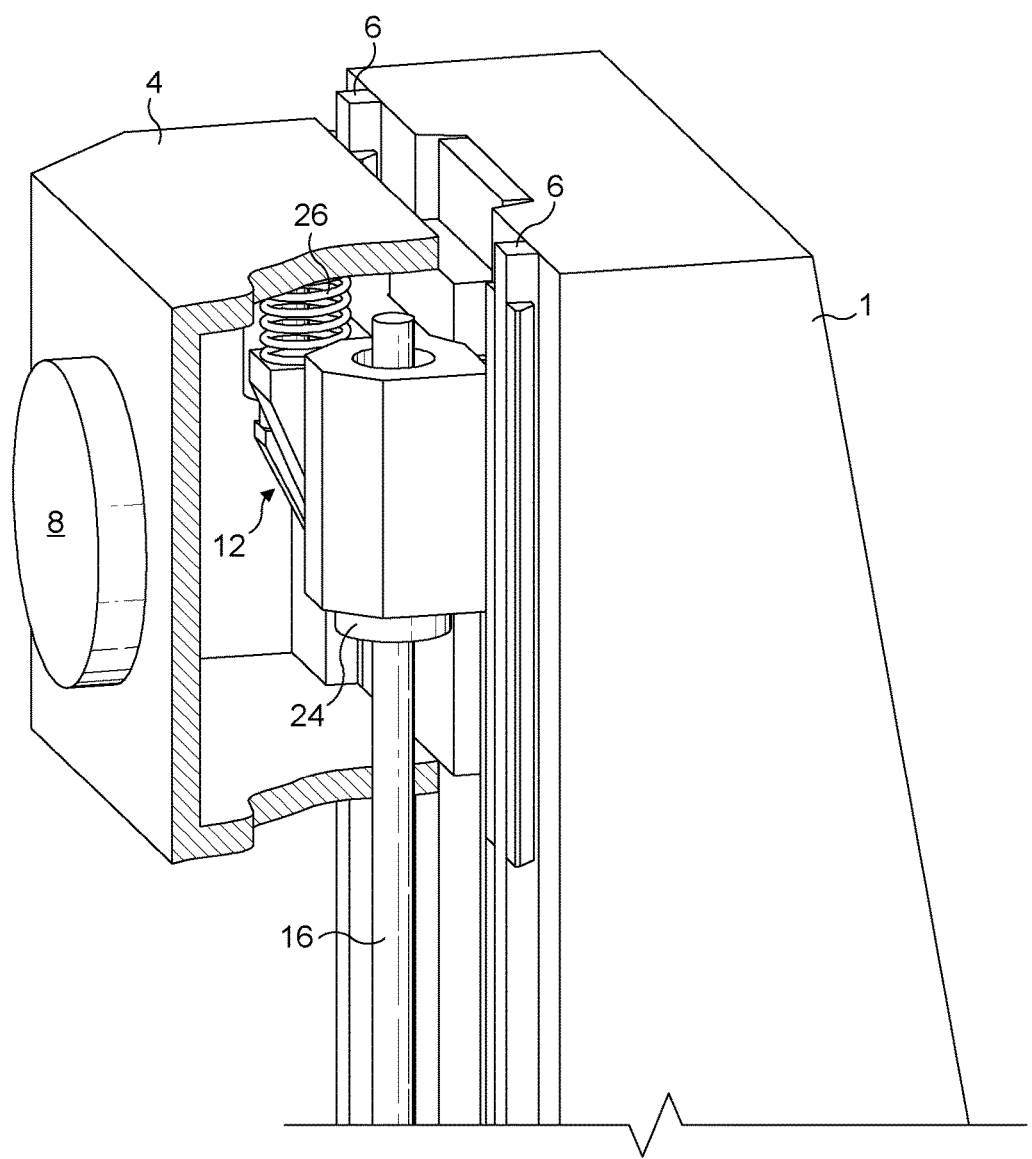
FIG. 6 is an enlarged partially cut-away side view of the upper portion of a machine axis according to another embodiment of the invention.

In other configurations, this secondary carriage may be positioned to the side, behind or in front of the primary carriage. It could also be at least partially accommodated within the dimensions of the primary carriage. In the embodiment of FIG. 6, the secondary carriage 12 is located within the body of the primary carriage 4, to provide a more compact configuration. Coil spring 26 bears against an inner wall of the body.

In other arrangements, the secondary carriage and its guideways 14 could be provided on the back or inside support column 1, and apply the preload force to the carriage via cables or chains running over pulleys, with the secondary carriage travelling in an opposite sense to the primary carriage. The coupling arrangement between the primary and secondary carriages would in this arrangement comprise cables or chains connected in series with a resilient component such as coil spring 26.

The screw 16 of the screw drive associated with the secondary carriage could be of a plain thread type, or a rolling element type such as a ball screw or roll screw. The degree of smoothness of motion or positioning accuracy of the second drive is low, as these effects will be substantially isolated from the primary carriage by the coupling arrangement.

The screw 16 may have a relatively fine pitch (that is a low helix angle) such that the drive will be non-reversible by its payload (that is the primary and secondary carriages). Alternatively, the screw could have a coarser pitch with a high ratio or worm/wormwheel gear box incorporated into the drive system, such that the drive system is again non-reversible. In this way, the secondary carriage and therefore the primary carriage would hold their position with the power removed from their respective drives.

In another configuration, a brake could be provided to prevent rotation of the screw 16 or its servo motor 20 when a stop condition is required.

A range of other types of drive may form the secondary drive which could satisfy the relatively low positioning accuracy requirement for the secondary carriage drive. For example, it may be in the form of a rack and pinion drive, a friction drive, a capstan drive, or pneumatic or hydraulic cylinders with positioning capability.

The secondary carriage may be utilised to carry out additional functions. For example, connections to the primary carriage may be achieved via the secondary carriage. Cable and pipe routings can be a source of disturbance and positioning errors due to the varying forces they exert as the machine axis moves. These conduits may be coupled to the secondary carriage, which has a lower requirement for positioning accuracy than the primary carriage. One or more short, flexible and relatively light connections are then employed to transfer services from the secondary to the primary carriage.

Figure 7:
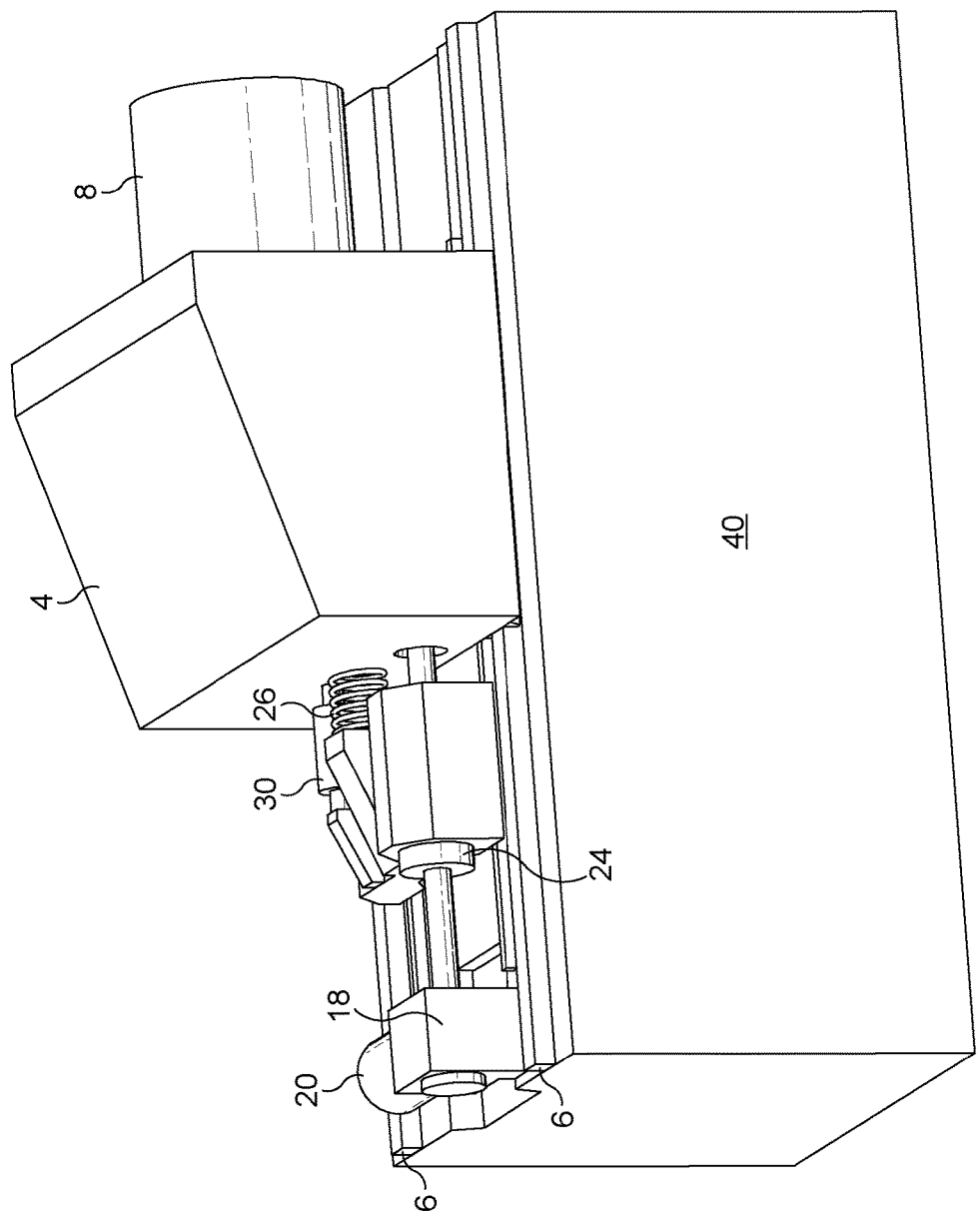
FIG. 7 is a front perspective view of a horizontal axis for a machine tool in accordance with the present invention.
Figure 8:
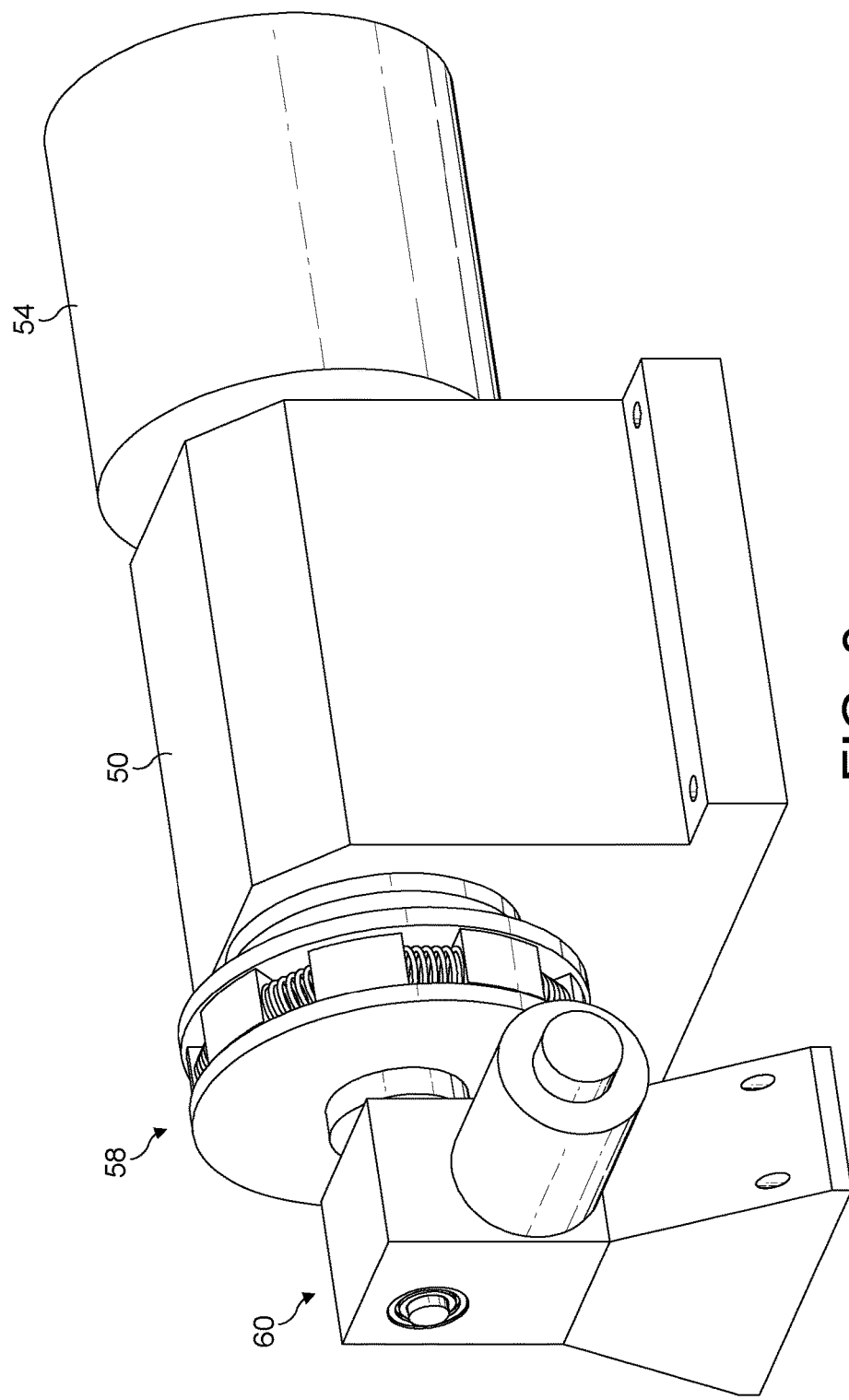
FIGS. 8 and 9 are front perspective and cross-sectional views, respectively, of a rotary axis for a machine tool according to a further embodiment of the invention.
Figure 9:
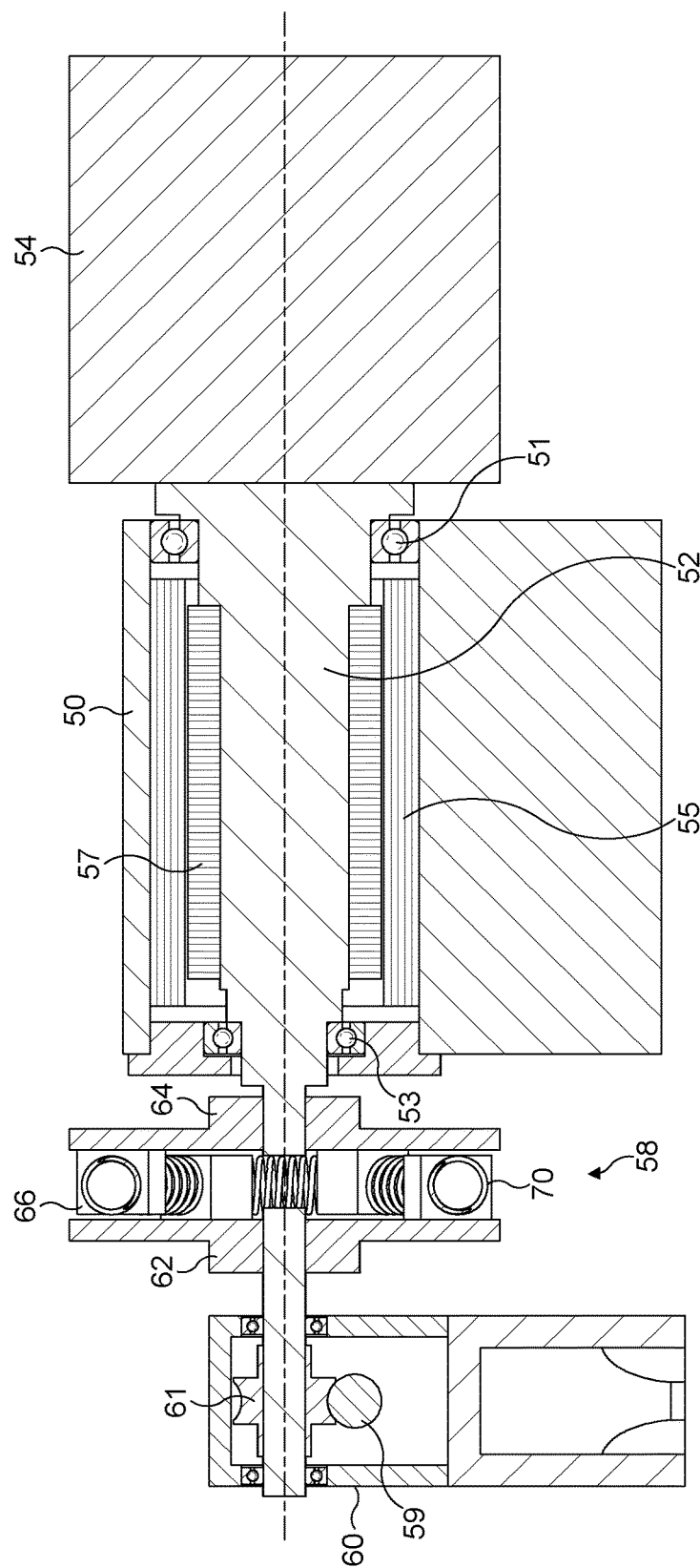
Figure 10:
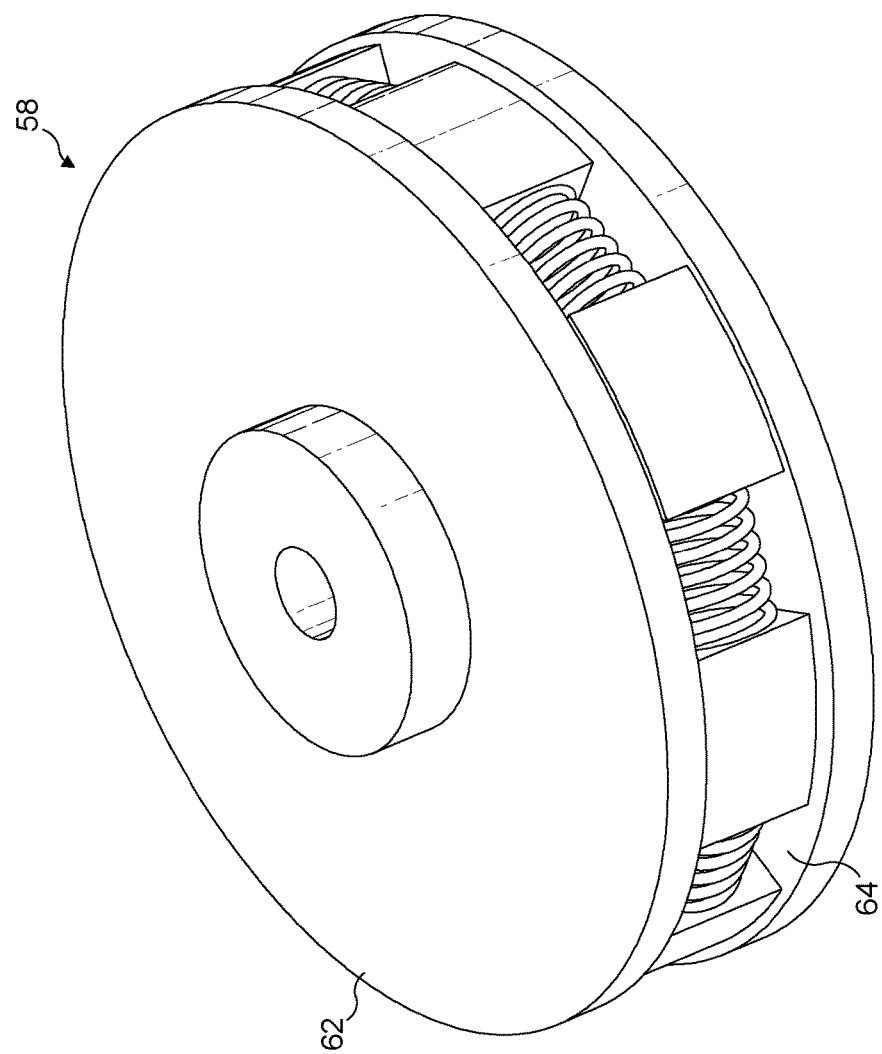
FIGS. 10 and 11 are a front perspective and transverse cross-sectional views, respectively of the resilient coupling arrangement of the machine axis depicted in FIGS. 8 and 9.
Figure 11:
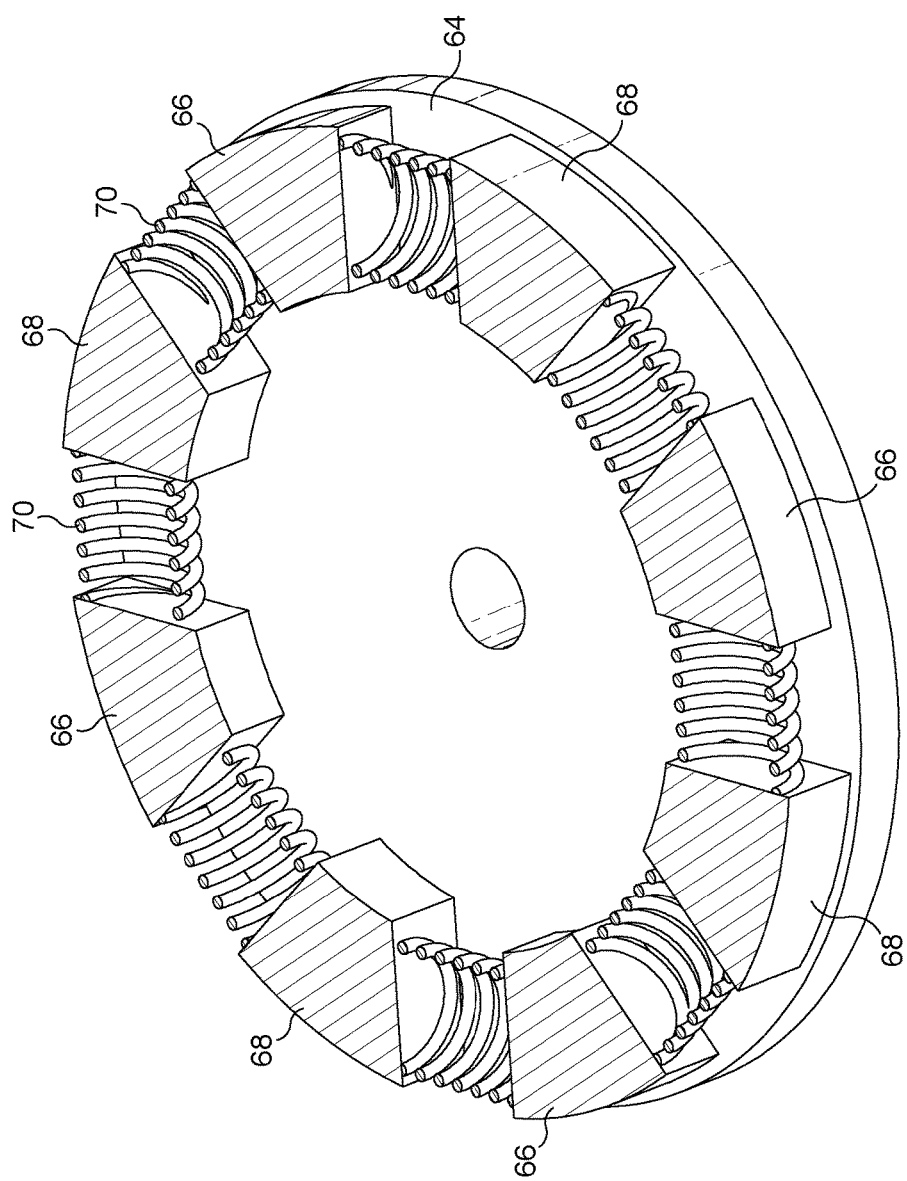

A further embodiment is depicted in FIG. 7. The arrangement of a primary carriage (or support) and a secondary carriage (or driven body) is similar to that shown in FIG. 1. However, in FIG. 7, the carriages are mounted on horizontally extending guideways. In this configuration, the secondary carriage is able to maintain the position of the primary carriage accurately against a constant opposing force. The guideways are mounted on a machine base 40.

A further embodiment of the invention involving a rotary machine axis will now be described with reference to FIGS. 8 to 11. As previously mentioned, there is an angular equivalent to the linear applications described above. This variation is now described using, as an example, a rotary machine axis, with a shaft or spindle as the main guided body, and a secondary rotating element forming the secondary guided body or driven body, with compliant coupling between them. A housing 50 contains a first drive in the form of a precision rotary motor drive arranged to move a support which is constituted by a shaft 52. The shaft 52 is supported on bearings 51 and 53. The drive has a direct drive motor stator 55 attached to the housing 50, and a direct drive motor rotor 57 attached to the shaft 52. Item 54 represents a workpiece, chuck or other tool mounted on one end of the support. The other end of the support is connected via a resilient coupling 58 to a second, relatively low precision drive 60. In the example depicted, this drive includes a worm 59 and gear-wheel 61 drive. As with previous embodiments, it will be appreciated that a range of drive types may be suitable for this purpose having sufficient mechanical advantage, and if possible, internal friction to provide the required non-reversible properties.

Coupling 58 functions as a rotary equivalent of the linear resilient coupling 26. It comprises two parallel, spaced apart discs 62 and 64. A set of eight wedge-shaped members are provided between the two discs at circumferentially spaced locations. Four of these members 66 are mounted on disc 62 whilst the other four members 68 are mounted on the other disc 64. A coil spring 70 is provided between each of the members. Rotation of one disc relative to the other in one direction will compress four of the springs, whilst rotation in the other direction will compress the other four springs. In this embodiment, disc 62 and the associated wedge-shaped members 66 effectively acts as a driven body as described herein coupled to support 52 via resilient coupling arrangement 58.

Coupling 58 is shown as one example of a suitable resilient rotary linkage. Other suitable arrangements will be apparent to the skilled reader.

Embodiments of the invention have been described with reference to carrying a tool or a workpiece on the machine axis, and it will be appreciated that the invention is applicable to use of a machine axis in a broad range of applications requiring precise position control. For example, it may be used in grinding, turning and polishing, and lithographic operations, and inspection of machined components.

Figure 12:
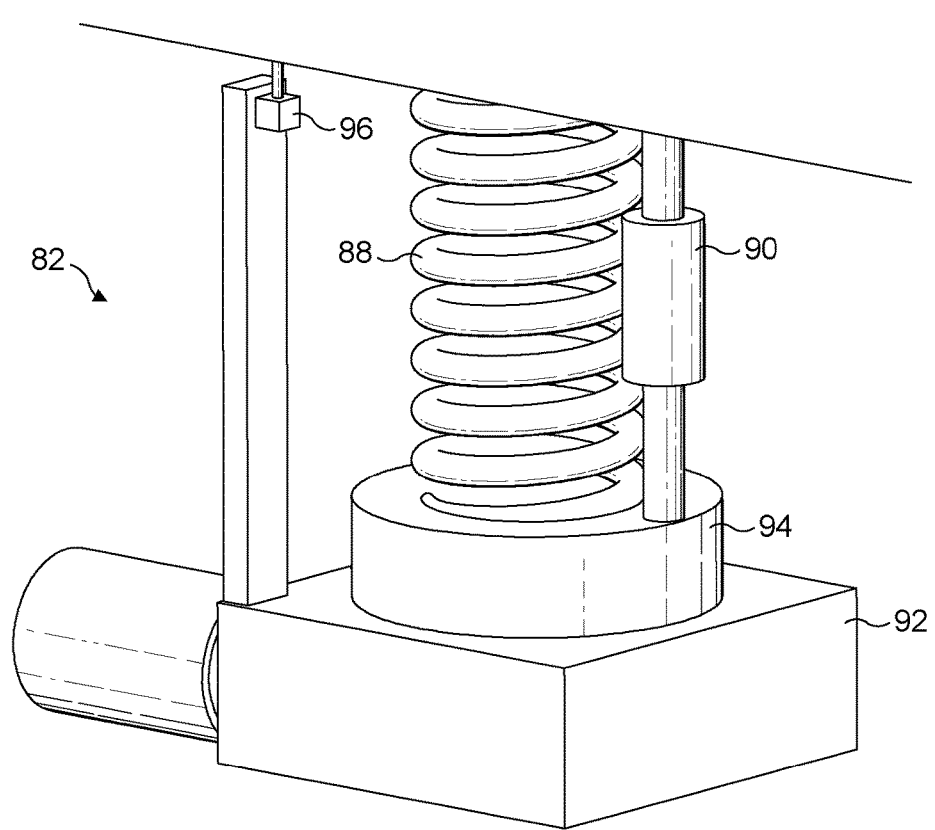
FIG. 12 is a side perspective view of a machine base support unit according to another embodiment of the invention.
Figure 13:
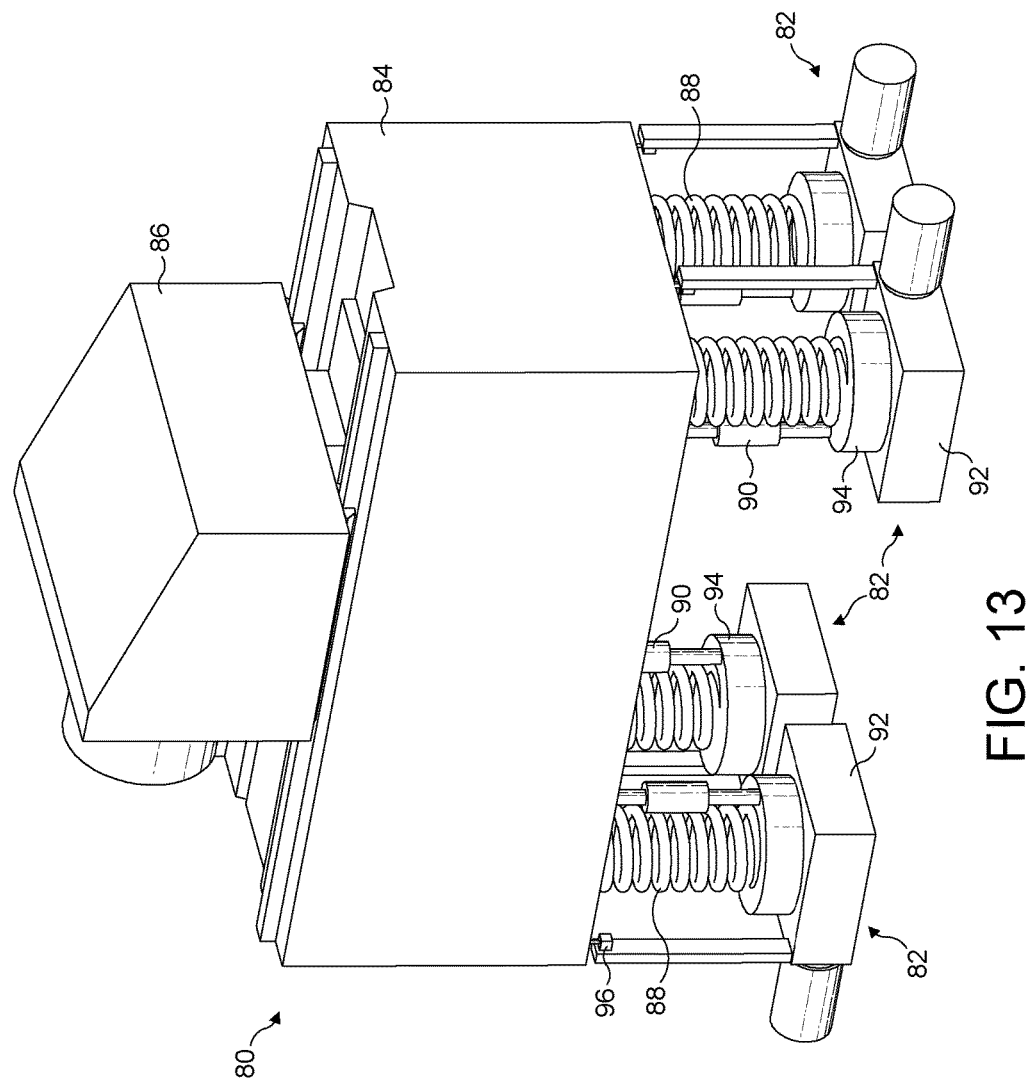
FIG. 13 is a side perspective view of a machine tool support on four units of the form shown in FIG. 12.
Figure 14:
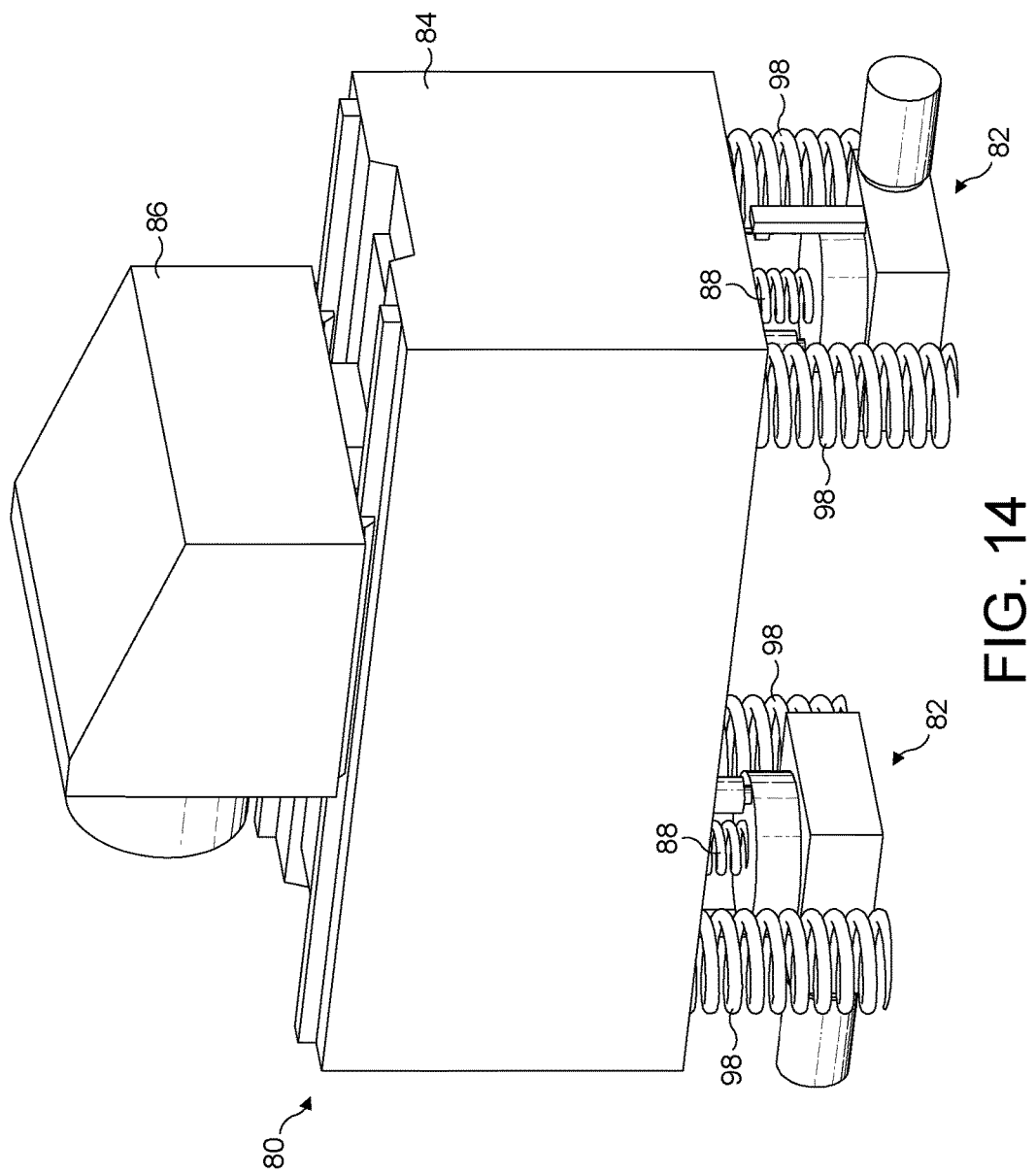
FIG. 14 is a side perspective view of a machine tool supported by two units of the form shown in FIG. 12 in combination with four primary support springs.

FIGS. 12 to 14 relate to embodiments of the present invention in which a counterforce mechanism of the form disclosed herein is employed to provide resilient support for a machine tool whilst maintaining its base in a desired orientation. A machine tool 80 is shown in FIG. 13 which is mounted on four base support units 82. An enlarged view of one of the support units is shown in FIG. 12.

The machine tool includes a machine base or bed 84 with a carriage 86 of significant mass mounted for linear movement along the bed. Movement of the carriage from one end of the bed to the other causes substantial variation in the forces exerted on the support units 82.

Each support unit includes a resilient or compliant coupling, in the form of a spring 88. This provides support for the machine mass whilst allowing relative movement between the machine base and the floor within certain frequency ranges (these frequencies being the range over which the devices are required to isolate). The support units may also include some form of damping, represented by damper units 90 to prevent uncontrolled bouncing of the machine on the springs 88. Each spring is mounted on a height adjustment device 92. Each device includes a motor-driven drive for changing the height of a driven body in the form of a platform 94.

Each support unit is arranged such that as the respective spring 88 is compressed due to a change in vertical force on the unit (for example resulting from movement of the carriage 86), the support unit adjusts the height of platform 94 to alter the counterforce exerted by spring 88 so as to maintain the desired machine base height above the floor.

The height of the machine base above the floor may be monitored using a displacement sensor 96, provided in engagement with the machine base. This generates a signal in response to changes in the height of the machine base in the vicinity of the respective support unit which is fed to a control arrangement of the support unit or machine tool to indicate a requirement for height adjustment. The control of machine height at each support unit position is therefore maintained in a closed-loop manner.

Another machine support implementation is depicted in FIG. 14. The configuration of the support units 82 correspond to that of the units shown in FIGS. 12 and 13. However, the weight of the machine tool is essentially borne by four primary springs 98. The secondary springs 88 associated with the support units are capable of exerting forces on the machine base corresponding to the variation in the load to be supported.

While the present invention has been illustrated by description of various embodiments and while those embodiments have been described in considerable detail, it is not the intention of applicant to restrict or in any way limit the scope of the appended claims to such details. Additional advantages and modifications will readily appear to those skilled in the art. The invention in its broader aspects is therefore not limited to the specific details and illustrative examples shown and described. Accordingly, departures may be made from such details without departing from the spirit or scope of Applicants' invention.

The invention claimed is:

1. A machine axis for a machine tool, comprising:
   a support for supporting a tool or a workpiece;
   a support drive for moving the support; and
   a counterforce mechanism comprising:
      a driven body;
      a drive for moving the driven body;
      a resilient coupling arrangement;
      a control arrangement, wherein the coupling arrangement couples the support and the driven body to each other, and the control arrangement is arranged to output a drive signal to the driven body drive to move the driven body to a location where it exerts a force on the support via the coupling arrangement, such that the force counteracts an opposing force acting on the support and the counterforce mechanism holds the support at the desired position, and the driven body is moveable along at least one guideway which guides the driven body in the direction of a linear reference axis and prevents rotation of the driven body relative to the linear reference axis of the guideway; and a safety mechanism for resisting a decrease in the spacing between the support and the driven body beyond a minimum threshold or for resisting an increase in the spacing between the support and the driven body beyond a maximum threshold.

2. A machine axis of claim 1, wherein the counterforce mechanism is configurable to exert a force on the support such that the support is held at a predetermined height above a support surface.

3. A machine axis of claim 1, wherein the axis of motion of the support is linear.

4. A machine axis of claim 3, wherein the support drive is a linear motor direct drive.

5. A machine axis of claim 1, wherein the support and driven body are moveable along a common guideway.

6. A machine axis of claim 1, including a sensor for detecting displacement of the support from the desired position and outputting a signal to the control arrangement in response thereto.

7. A machine axis of claim 1 including:
a damping mechanism for decelerating one of the support and the driven body relative to the other.

8. A machine axis of claim 1, wherein the driven body is moveable relative to the same axis of motion as the support.

9. A machine axis of claim 1, wherein the driven body is located within the support.

10. A machine axis of claim 1, wherein the control arrangement is configured to adjust the position of the driven body having regard to the power demand of the support drive.

11. A machine axis of claim 1, wherein the driven body drive is able to hold the driven body in position without requiring electrical power.

12. A machine tool including a machine axis of claim 1.

13. A machine axis of claim 1, including a brake mechanism for resisting movement of the support when the driving force exerted by the support drive is removed.

14. A machine axis for a machine tool, comprising:
a support for supporting a tool or a workpiece;
a support drive for moving the support; and
a counterforce mechanism comprising:
  a driven body;
  a drive for moving the driven body;
  a resilient coupling arrangement;
  a control arrangement, wherein the coupling arrangement couples the support and the driven body to each other, and the control arrangement is arranged to output a drive signal to the driven body drive to move the driven body to a location where it exerts a force on the support via the coupling arrangement, such that the force counteracts an opposing force acting on the support and the counterforce mechanism holds the support at a desired position, and wherein an axis of motion of the support is rotary; and
  a safety mechanism for resisting a decrease in the spacing between the support and the driven body beyond a minimum threshold or for resisting an increase in the spacing between the support and the driven body beyond a maximum threshold.

15. A machine axis of claim 14, wherein the support drive is a rotary motor direct drive.

16. A machine axis of claim 14, wherein the support is rotatable in use about an axis, and the driven body is rotatable about an axis to an angular position dependent on the angular position of the support so as to exert a force on the support via the coupling arrangement to counteract torsional forces acting on the support.

17. A machine axis of claim 16, wherein the support and driven body are rotatable around a common axis of rotation.

18. A machine axis of claim 14, including a sensor for detecting displacement of the support from the desired position and outputting a signal to the control arrangement in response thereto.

19. A machine axis of claim 14, including:
a damping mechanism for decelerating one of the support and the driven body relative to the other.

20. A machine axis of claim 19, including a brake mechanism for resisting movement of the support when the driving force exerted by the support drive is removed.

21. A machine axis of claim 14, wherein the driven body is moveable relative to the same axis of motion as the support.

22. A machine axis of claim 14, wherein the driven body is located within the support.

23. A machine axis of claim 14, wherein the control arrangement is configured to adjust the position of the driven body having regard to the power demand of the support drive.

24. A machine axis of claim 14, wherein the driven body drive is able to hold the driven body in position without requiring electrical power.

25. A machine tool including a machine axis of claim 14.

* * * * *